(12) United States Patent
Igari

(10) Patent No.: US 8,016,439 B2
(45) Date of Patent: Sep. 13, 2011

(54) SOLAR SIMULATOR

(75) Inventor: Sanekazu Igari, Ishioka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 245 days.

(21) Appl. No.: 12/513,301

(22) PCT Filed: Nov. 6, 2007

(86) PCT No.: PCT/JP2007/071573
§ 371 (c)(1),
(2), (4) Date: May 1, 2009

(87) PCT Pub. No.: WO2008/059733
PCT Pub. Date: May 22, 2008

(65) Prior Publication Data
US 2010/0027236 A1     Feb. 4, 2010

(30) Foreign Application Priority Data

Nov. 15, 2006   (JP) ................. 2006-309113

(51) Int. Cl.
*F21V 5/00* (2006.01)
*F21S 8/00* (2006.01)

(52) U.S. Cl. ............ 362/1; 362/268; 362/331; 362/332; 362/2

(58) Field of Classification Search ........... 362/1, 2, 362/268, 331, 332
See application file for complete search history.

(56) References Cited

U.S. PATENT DOCUMENTS

| | | | |
|---|---|---|---|
| 4,641,227 A * | 2/1987 | Kusuhara | 362/231 |
| 5,217,285 A * | 6/1993 | Sopori | 362/1 |
| 5,634,704 A | 6/1997 | Shikama et al. | |
| 6,866,404 B2 * | 3/2005 | Yamauchi et al. | 362/299 |
| 2010/0014080 A1 * | 1/2010 | Jungwirth et al. | 356/326 |
| 2010/0274392 A1 * | 10/2010 | Igari et al. | 700/275 |

FOREIGN PATENT DOCUMENTS

| | | |
|---|---|---|
| JP | 58-059595 A | 4/1983 |
| JP | 07-098479 A | 4/1995 |
| JP | 2001-042432 A | 2/2001 |
| JP | 2002-116501 A | 4/2002 |
| JP | 2002-189192 A | 7/2002 |
| JP | 2003-279719 A | 10/2003 |
| JP | 3098792 U | 3/2004 |
| JP | 2004-245912 A | 9/2004 |

\* cited by examiner

*Primary Examiner* — Stephen F Husar
*Assistant Examiner* — James W Cranson
(74) *Attorney, Agent, or Firm* — Sughrue Mion, PLLC

(57) ABSTRACT

A solar simulator that simultaneously solves problems of high parallelism and high illuminance of emission light and increases uniformity of the emission light is provided.

The following is an examiner's statement of reasons for allowance: Instant application claims and discloses a solar simulator that allows light radiated from a light source to be incident on an integrator, allows light emitted from integrator to be incident on a collimation lens, and allows parallel light to be emitted from collimation lens when a circumradius of integrator is r, a parallelism angle of parallel light is .phi., and a focal distance of collimation lens is f=r/tan.phi., focal distance f is selected so parallelism angle .phi. becomes less than 2.5.degree., and when an emission angle of light emitted from integrator is .theta., a diameter of collimation lens is D, and a viewing angle of collimation lens when viewed from integrator is .theta.X=2.times.a tan (D/2f), emission angle .theta. is configured to be smaller than viewing angle .theta.X.

The combination of limitations claimed is not found, taught or suggested by the prior art.

2 Claims, 4 Drawing Sheets

Prior Art

US 8,016,439 B2

SOLAR SIMULATOR

TECHNICAL FIELD

The present invention relates to a solar simulator used for a measurement in a solar panel.

BACKGROUND ART

FIG. 3 is a diagram illustrating an optical structure of a solar simulator according to the related art.

As shown in the drawing, generally, after collecting light emitted from a light source (not shown) to be close to an optical axis using an integrator 4 for uniform irradiation where an incident angle θ1 and an emission angle θ2 are equally designed, the light is converged by a collimation lens 5, thereby obtaining emission light having high parallelism.

In this case, a parallelism angle φ of the light emitted from the collimation lens 5 can approximate to φ≈a tan (r/f). However, r indicates a circumradius of the integrator 4, and f indicates a focal distance of the collimation lens 5.

In the related art, in the above structure, in order to increase a parallelism angle of an emission light beam (decrease φ), a method where the focal distance f of the collimation lens is set to be large has been used.

Patent Document 1: Japanese Patent Application Laid-Open No. 2002-189192
Patent Document 2: Japanese Patent Application Laid-Open No. 2002-116501
Patent Document 3: Japanese Patent Application Laid-Open No. 2001-042432

DISCLOSURE OF THE INVENTION

Problems to be Solved by the Invention

However, in the optical structure shown in FIG. 3, in the state where the emission angle θ2 of the integrator 4 is fixed, as shown in FIG. 4, if the focal distance f of the collimation lens 5 is increased in order to increase the parallelism angle θ, a distance between the integrator 4 and the collimation lens 5 is increased. As a result, the emission light from the integrator 4 greatly diffuses to the outside of the collimation lens 5. That is, most of the light emitted from the integrator 4 may diffuse to the outside of the collimation lens 5. For this reason, there occurs a problem in that a loss of light energy is increased and illuminance of the parallel light obtained from the collimation lens 5 is decreased.

An object of the present invention is to provide a solar simulator that can simultaneously solve problems of high parallelism and high illuminance of emission light and increase uniformity of the emission light.

Means for Solving the Problems

The present invention uses the following means to solve the above-described problems.

A first means is a solar simulator that allows light radiated from a light source to be incident on an integrator, allows light emitted from the integrator to be incident on a collimation lens, and allows parallel light to be emitted from the collimation lens. In the solar simulator, when a circumradius of the integrator is r, a parallelism angle of the parallel light is φ, and a focal distance of the collimation lens is f=r/tan φ, the focal distance f is selected such that the parallelism angle φ becomes less than 2.5°. When an emission angle of the light emitted from the integrator is θ, a diameter of the collimation lens is D, and a viewing angle of the collimation lens when viewed from the integrator is θX=2×a tan (D/2f), the emission angle θ is configured to be smaller than the viewing angle θX.

A second means is a solar simulator in which the integrator is composed of a collection of a plurality of minute integrators whose one side is 5 mm or less, and the circumradius r of the integrator is 10.6 mm or less, in the first means.

Effects of the Invention

According to the invention described in claim 1, light having high illuminance converted to have high parallelism is obtained in an irradiation surface.

According to the invention described in claim 2, light converted to have high uniformity is obtained in an irradiation surface.

Figure 1:
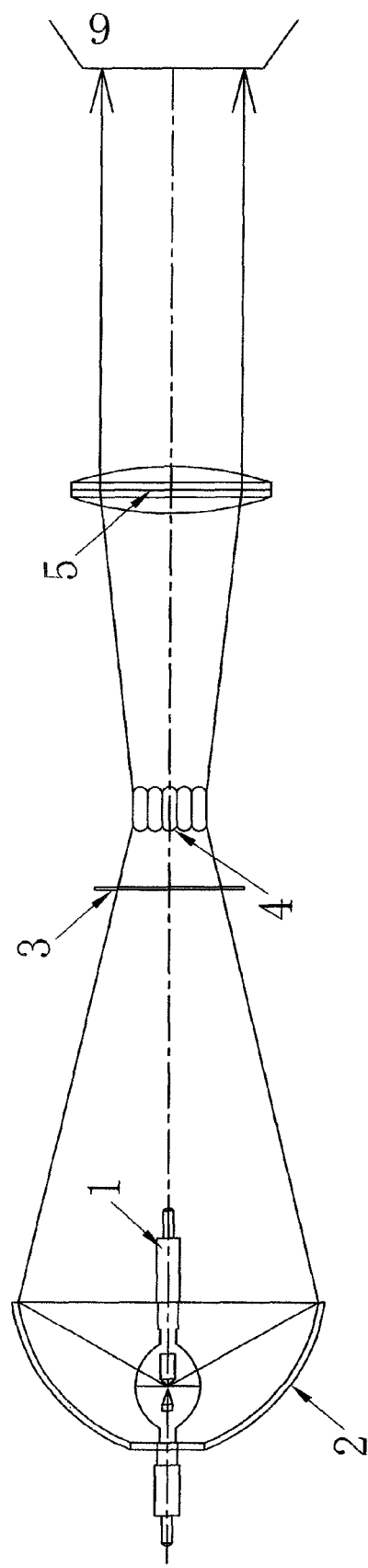
FIG. 1 is a diagram illustrating the configuration of a solar simulator according to the present invention.

| Description of Reference Numerals | |
|---|---|
| 1: | Xe (xenon) lamp |
| 2: | elliptical mirror |
| 3: | AM (Air Mass) filter |
| 4: | integrator |
| 5: | collimation lens |
| 6: | irradiation surface |
| 7: | irradiation area |
| θ1: | incident angle |
| θ2: | emission angle |
| θX: | viewing angle |
| φ: | parallelism angle |
| f: | focal distance |
| r: | circumradius |
| D: | diameter |

BEST MODE FOR CARRYING OUT THE INVENTION

An embodiment of the present invention will be described using FIGS. 1 to 4.

FIG. 1 is a diagram illustrating the configuration of a solar simulator according to an embodiment of the present invention.

As shown in the drawing, for example, light emitted from a 300-W Xe (xenon) lamp 1 is reflected by an elliptical mirror 2, and incident on an integrator 4, which is composed of a collection of minute integrators having a small emission angle, through an AM (Air Mass) filter 3. The light emitted from the integrator 4 is incident on a collimation lens 5 that has a long focal distance, and emitted as light having high parallelism. The emitted light having high parallelism is irradiated onto an irradiation surface 6 of a solar panel or the like with high illuminance.

Figure 2:
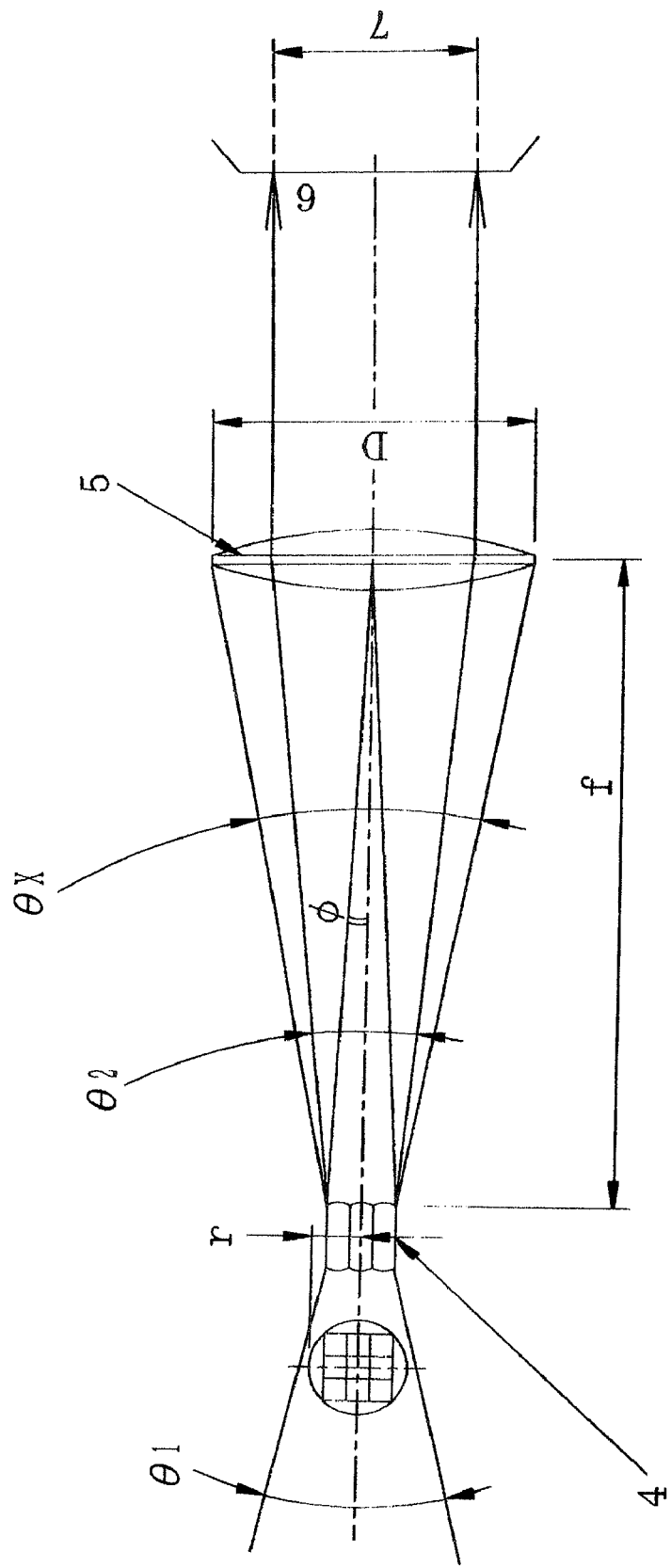
FIG. 2 is a diagram illustrating an optical structure used to increase a parallelism angle of emission light and illuminance in an irradiation surface, in a solar simulator shown in FIG. 1.

FIG. 2 is a diagram illustrating an optical structure used to increase a parallelism angle of emission light, in a solar simulator shown in FIG. 1.

In the drawing, light radiated from a light source (not shown) is incident on the integrator 4, light emitted from the integrator 4 is incident on the collimation lens 5, and parallel light is emitted from the collimation lens 5.

In this case, it is assumed that a circumradius of the integrator 4 is r, a parallelism angle of the parallel light is φ, a focal distance of the collimation lens 5 is f, a distance between the integrator 4 and the collimation lens 5 is L, an incident angle of the integrator 4 is θ1, an emission angle of the integrator 4 is θ2, a diameter of the collimation lens 5 is D, and a viewing angle of the collimation lens 5 when viewed from the integrator 4 is θX.

In general, the integrator 4 is composed of a collection of minute integrators having a square section. For example, the integrator 4 is composed of a collection of minute square integrators of a 5 mm angle, that is, a collection of 3×3=9 minute integrators. In order to make an external shape of the collection maximally approximate to a circumcircle, the section of each minute integrator may be configured to have a polygon other than a square, for example, a regular hexagon.

In the case where the light emitted from the integrator 4 is converged by the collimation lens 5 that has the focal distance of f and a radius r of the circumcircle of the integrator 4 infinitely approximates to zero, if the distance between the integrator 4 and the collimation lens 5 is set to be equal to the focal distance f, the emission light from the collimation lens 5 becomes complete parallel light when ignoring a spherical aberration and a chromatic aberration.

However, as described above, since the actual integrator 4 is composed of a collection of minute integrators, the circumradius r has a finite size. Therefore, light on a circumference (light of each of the minute integrators) does not become complete parallel light, because an angle that the light forms with an optical axis after passing through the collimation lens 5 becomes an error.

That is, the parallelism angle φ of the emission light from the collimation lens 5 is calculated as the viewing angle of the circumradius r when viewing the integrator 4 from the center of the collimation lens 5. The parallelism angle φ is represented by the following Equation.

$$\phi = a\tan(r/L) \approx a\tan(r/f)$$

In this case, when φ is small, a relation of L≈f is used.

For example, when the circumradius r of the integrator 4 is 10.6 mm and the focal distance f of the collimation lens 5 is 200 mm, the parallelism angle φ is 3.04°. When the circumradius r of the integrator 4 is 10.6 mm and the focal distance f of the collimation lens 5 is 320 mm, the parallelism angle φ is 1.90°. That is, if the focal distance f of the collimation lens 5 is increased from 200 mm to 320 mm, it is possible to improve an actually measured parallelism angle φ from 3.0° to 1.9°. From the above result, it can be seen that the collimation lens 5 preferably has a long focus in order to obtain light having high parallelism.

Figure 3:
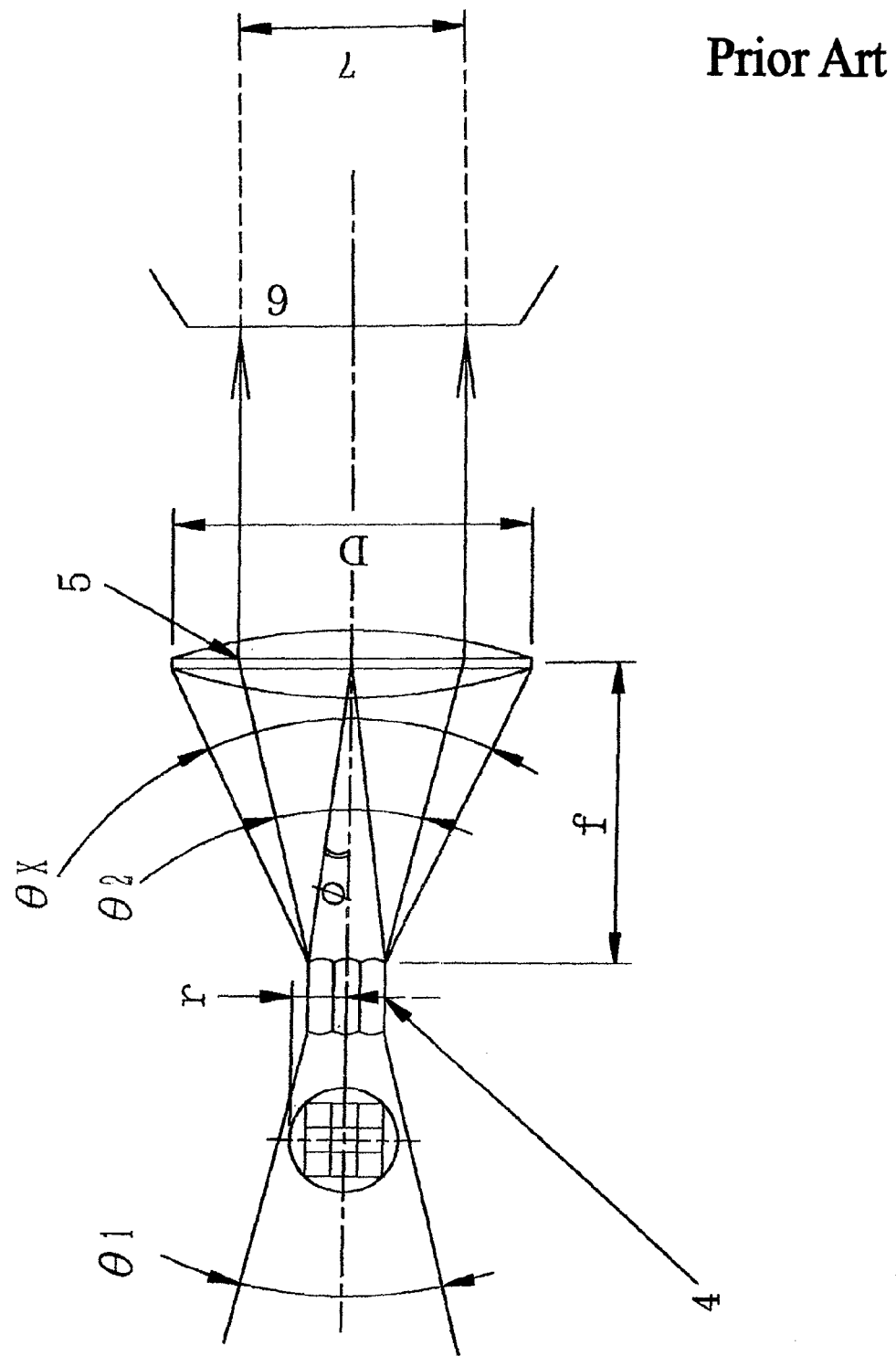
FIG. 3 is a diagram illustrating an optical structure in a solar simulator according to the related art.
Figure 4:
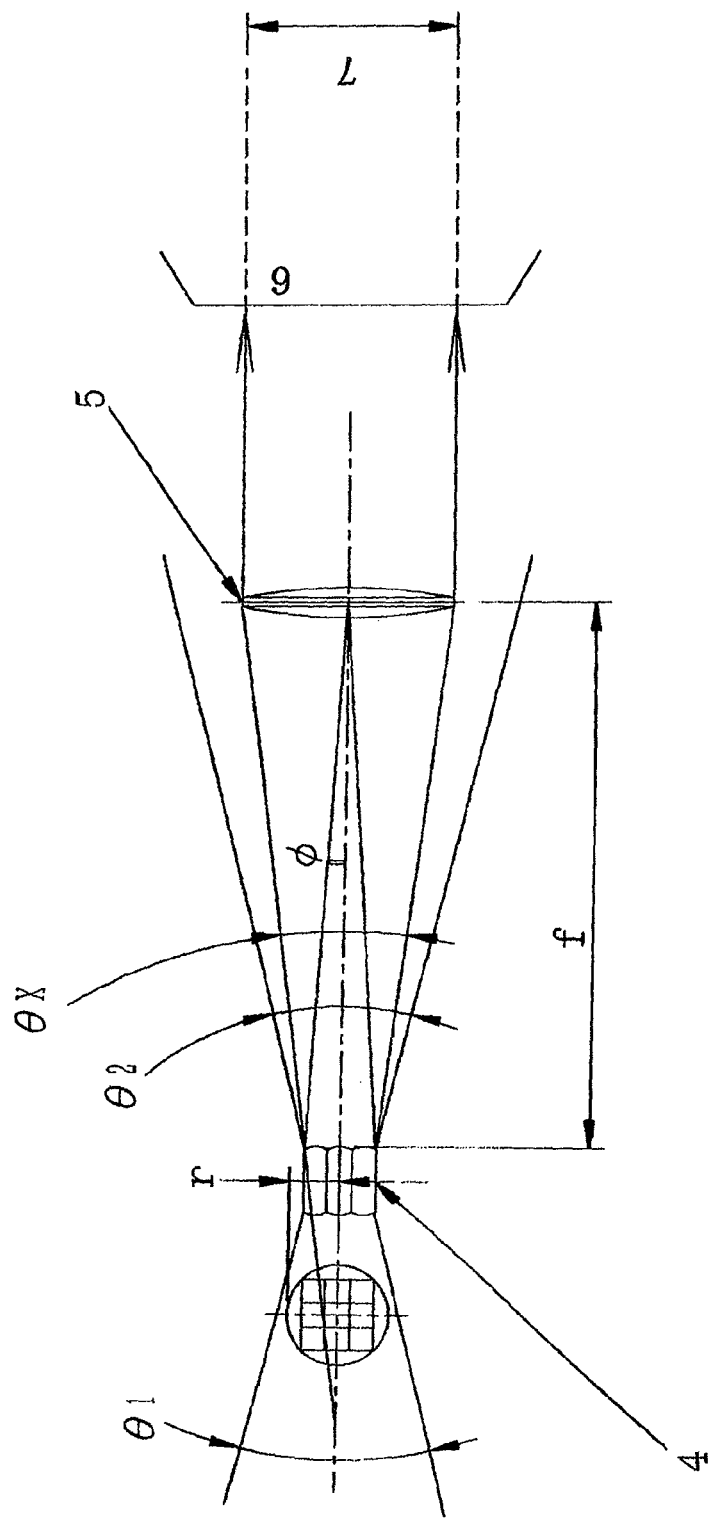
FIG. 4 is a diagram illustrating a standard optical structure used in order to increase a parallelism angle of emission light, in a solar simulator according to the related art.

The following Table shows an parallelism angle of light emitted from the collimation lens 5 and illuminance in the irradiation surface 6, when the emission angle θ2 of the integrator 4, the viewing angle θX of the collimation lens 5 when viewed from the integrator 4, and the focal distance f of the collimation lens 5 are varied in the optical structure shown in FIGS. 2 to 4. The viewing angle θX is shown by θX=2×a tan (D/2f) and the incident angle θ1 of the integrator 4 is 27°.

TABLE 1

| Corresponding diagram | Emission angle | Viewing angle | Focal distance | Parallelism angle | Illuminance (mW/cm²) |
|---|---|---|---|---|---|
| FIG. 3 | 27° | 35° | 200 mm | 3.04° | 100 |
| FIG. 3 | 27° | 30° | 250 mm | 2.49° | 67 |
| FIG. 4 | 27° | 23° | 320 mm | 1.90° | 39 |
| FIG. 2 | 17° | 20° | 320 mm | 1.90° | 97 |

As shown in the above Table, in the optical structure according to the related art shown in FIGS. 3 and 4, when the emission angle θ2 of the integrator 4 and the incident angle θ1 are equally fixed to 27°, the parallelism angle is improved as 3.04°, 2.43°, and 1.90° as the focal distance f increases to 200 mm, 250 mm, and 320 mm. However, it can be seen that the illuminance decreases to 100 mW/cm², 67 mW/cm², and 39 mW/cm². As such, if the emission angle θ2 is large as 27°, it can be seen that it is not possible to obtain desired high illuminance of 100 mW/cm², when the collimation lens 5 does not have a relatively short focus.

That is, in the optical structure shown in FIG. 4, if the focal distance f of the collimation lens 5 is increased to 320 mm in order to obtain high parallelism where the parallelism angle is 1.90°, the illuminance may become low illuminance as 39 mW/cm². In contrast, in the optical structure shown in FIG. 3, if the focal distance f of the collimation lens 5 is decreased to 200 mm in order to maintain illuminance at 100 mW/cm², the parallelism angle may be reduced to 3.04°.

Meanwhile, in order to solve the above problem, in the optical structure of the present invention shown in FIG. 2, the emission angle θ2 of the integrator 4 is configured to become smaller than the viewing angle θX of the collimation lens 5 when viewed from the center of the integrator 4. By this configuration, even though if the focal distance f of the collimation lens 5 is increased to 320 mm in order to obtain high parallelism of 1.90°, the illuminance becomes 97 mW/cm², and the illuminance that is approximately equal to the maximum illuminance 100 mW/cm² in the optical structure shown in FIG. 3 is obtained.

Another characteristic required in the solar simulator is to equalize illuminance in the irradiation surface 6. In order to obtain high uniformity, for example, in a collection of a plurality of minute integrators whose diameter is 5 mm or less, the high uniformity can be realized by using the integrator where the circumradius r of the collection is 10.6 mm.

As the result obtained by actually measuring the segmentation effect of the integrator 4 when the focal distance of the collimation lens 5 is 320 mm and the effective irradiation area in the irradiation surface 6 is set as a 60 mm angle according to the number of the minute integrators such as 9 and 25, the uniformity in the irradiation surface 6 in the case of using 3×3=9 integrators 4 is ±4.5%, and the uniformity in the irradiation surface 6 in the case of using 5×5=25 integrators 4 is ±1.5%. As shown in the actual measurement result, the uniformity of the illuminance is improved three times by segmenting the number of integrators 4 from 9 to 25.

The invention claimed is:

1. A solar simulator that allows light radiated from a light source to be incident on an integrator, allows light emitted from the integrator to be incident on a collimation lens, and allows parallel light to be emitted from the collimation lens,
    wherein, when a circumradius of the integrator is r, a parallelism angle of the parallel light is φ, and a focal distance of the collimation lens is f=r/tan φ, the focal distance f is selected such that the parallelism angle φ becomes less than 2.5°, and when an emission angle of the light emitted from the integrator is θ, a diameter of the collimation lens is D, and a viewing angle of the collimation lens when viewed from the integrator is θX=2×a tan (D/2f), the emission angle θ is configured to be smaller than the viewing angle θX.

2. The solar simulator according to claim 1, wherein the integrator is composed of a collection of a plurality of minute integrators whose one side is 5 mm or less, and the circumradius r of the integrator is 10.6 mm or less.

* * * * *